United States Patent [19]

Scott

[11] 4,391,954

[45] Jul. 5, 1983

[54] THERMOPLASTIC MOLDING COMPOSITION

[75] Inventor: Steven W. Scott, Evansville, Ind.

[73] Assignee: General Electric Company, Mt. Vernon, Ind.

[21] Appl. No.: 243,142

[22] Filed: Mar. 12, 1981

Related U.S. Application Data

[63] Continuation of Ser. No. 750,512, Dec. 14, 1976, abandoned.

[51] Int. Cl.$^3$ .............................................. C08L 67/02
[52] U.S. Cl. .................................... 525/439; 525/466
[58] Field of Search ................................ 525/439, 466

[56] References Cited

U.S. PATENT DOCUMENTS

| | | | |
|---|---|---|---|
| 3,915,926 | 10/1975 | Wambach | 260/40 R |
| 3,931,094 | 1/1976 | Segal et al. | 260/40 R |
| 3,950,301 | 4/1976 | Balog et al. | 260/40 R |
| 3,953,539 | 4/1976 | Kawase et al. | 260/45.7 P |
| 4,056,504 | 11/1977 | Grundmeier et al. | 260/37 PC |
| 4,061,691 | 12/1977 | Margotte et al. | 260/37 PC |

*Primary Examiner*—Lorenzo B. Hayes
*Assistant Examiner*—Amelia B. Yarbrough
*Attorney, Agent, or Firm*—Martin B. Barancik

[57] ABSTRACT

A thermoplastic molding composition comprising an aromatic carbonate polymer and a polyester derived from a cyclohexanedimethanol.

5 Claims, No Drawings

THERMOPLASTIC MOLDING COMPOSITION

This is a continuation, of copending application Ser. No. 750,512, filed Dec. 14, 1976, now abandoned.

This invention is directed to a novel thermoplastic molding composition comprising an aromatic carbonate polymer and a thermoplastic polyester resin derived from cyclohexanedimethanol. This composition may additionally contain a reinforcing amount of a reinforcing filler.

BACKGROUND OF THE INVENTION

Polycarbonates are well known and have been widely employed for the production of thermoplastic molded articles.

Polycarbonate is a high-performance plastic with good impact strength. In addition to ductility (impact strength), general-purpose polycarbonate has high transparency, wide temperature limits (high impact resistance below −60° C. and a UL thermal endurance rating of 115° C. with impact), good dimensional stability high creep resistance and electrical properties which qualify it as sole support for current carrying parts (up to 125° C. without loss of impact strength).

Polycarbonate has low water absorption, good stain resistance and a wide range of colorability. A weak area for polycarbonate is its relatively limited range of chemical resistance, which necessitates careful appraisal of applications involving contact with certain organic solvents, some detergents, strong alkali, certain fats, oils, and greases. Also, another weak area of polycarbonates is that they have high melt viscosities which makes them to some extent difficult to mold.

Attempts have been made to blend polycarbonates with various polymeric systems. Generally, the polycarbonate is not miscible with uniformity with the other polymer system. However, U.S. Pat. No. 3,218,372, for example, describes compositions of polyalkylene terephthalate and polycarbonate resins. These unreinforced compositions are described as having a reduced melt viscosity and as having a higher ductility than the polyalkylene terephthalate resins. Even in the occasional instances where the polycarbonate is miscible with the other polymer system, the properties which make polycarbonate a high performance plastic are generally reduced without additional advantages.

DESCRIPTION OF THE INVENTION

It has been discovered that when an aromatic carbonate polymer is added to a polyester polymer derived from cyclohexanedimethanol, the polycarbonate is compatable with this polyester over a wide range. An article molded from this composition retains the transparent characteristics of an article molded from the polycarbonate. Also, this is achieved without any appreciable decrease in the mechanical and physical properties, such as Gardner impact strength, tensile strength or flexural strength, of a typical polycarbonate molding composition. Also, the composition of the instant invention has a reduced melt viscosity which results in easier molding. Further, an article molded from this composition has better hydrolysis resistance and reduced water vapor transmission rate (this is important in bottles and packaging).

The instant thermoplastic molding composition comprises:

(a) an aromatic carbonate polymer; and (b) a polyester polymer derived from cyclohexanedimethanol.

In a preferred embodiment, the instant thermoplastic composition comprises:

(a) an aromatic carbonate polymer;

(b) a polyester polymer derived from cyclohexanedimethanol; and (c) a reinforcing amount of a reinforcing filler.

The aromatic carbonate polymer of the instant invention has recurring units of the formula:

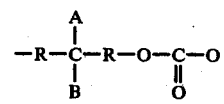

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

The aromatic carbonate polymer of this invention may be prepared by methods well known in the art and as described in U.S. Pat. No. 3,989,672 all of which are incorporated by reference.

Also, included herein are branched polycarbonates wherein a polyfunctional aromatic compound is reacted with the dihydric phenol and carbonate precursor to provide a thermoplastic randomly branched polycarbonate wherein the recurring units of formula I. contain branching groups.

The preferred polycarbonate resins may be derived from the reaction of bisphenol-A and phosgene. These polycarbonates have from 10–400 recurring units of the formula:

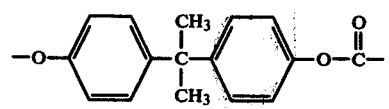

The polycarbonate should have an intrinsic viscosity between 0.3 and 1.0, preferably from 0.40 to 0.65 as measured at 25° C. in methylene chloride.

The instant polyesters are prepared by condensing either the cis- or trans- isomer (or a mixture thereof) of 1,4-cyclohexanedimethanol with a hexacarbocyclic dicarboxylic acid so as to produce a polyester having recurring units having the following formula:

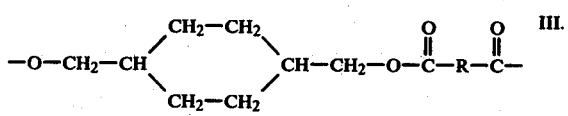

wherein the substituted cyclohexane ring is selected from the group consisting of the cis- and trans- isomers thereof and R represents an organic radical containing from 6 to 20 carbon atoms which is the decarboxylated residue derived from a hexacarbocyclic dicarboxylic acid.

The preferred polyester resins may be derived from the reaction of either the cis- or trans- isomer (or a mixture thereof) of 1,4-cyclohexanedimethanol with a mixture of iso- and terephthalic acids. These polyesters have recurring units of the formula:

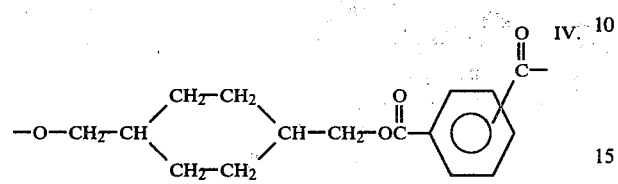

These polyesters can be produced by well known methods in the art such as those set forth in U.S. Pat. No. 2,901,466 which is incorporated herein by reference.

Of course, it is understood that the polyester resins of this invention can be prepared by condensing 1,4-cyclohexanedimethanol and minor amounts of other bifunctional glycols with the hexacarbocyclic dicarboxylic acid. These other bifunctional glycols include the polymethylene glycols containing from 2 to 10 or more carbon atoms such as ethylene glycol, butylene glycol, etc.

Examples of hexacarbocyclic dicarboxylic acids wherein the carboxy radicals are attached in para relationship to a hexacarbocyclic residue indicated by R in formula III include terephthalic acid, trans-hexhydroterephthalic acid, p,p'-sulfonyldibenzoic acid, 4,4'-diphenic acid, 4,4'-benzophenonedicarboxylic acid, 1,2-di(p-carboxyphenyl) ethane, 1,2-di(p-carboxyphenoxy) ethane, 4,4'-dicarboxydiphenyl ether, etc. and mixtures of these. All of these acids contain at least one hexacarbocyclic nucleus. Fused rings can also be present such as in 1,4- or 1,5-naphthalenedicarboxylic acid. The hexacarbocyclic dicarboxylic acids are preferably those containing a trans-cyclohexane nucleus or an aromatic nucleus containing from one to two benzene rings of which at least one has the usual benzenoid unsaturation. Of course, either fused or attached rings can be present. All of the compounds named in this paragraph come within the scope of this preferred group. The preferred dicarboxylic acid is terephthalic acid, or mixtures of terephthalic and isophthalic acids.

These polyesters should have an intrinsic viscosity between 0.40 and 2.0 dl./g. measured in a mixture of 40% tetrachloroethane/60% phenol solution or a similar solvent at 25° C.-30° C. Especially preferred polyester will have an intrinsic viscosity in the range of 0.6 and 1.2 dl./g.

The reinforcing agents may be selected from finely divided aluminum, iron or nickel and the like, metal oxides and non-metals, such as carbon filaments, silicates, such as mica, aluminum silicate (clay), talc, asbestos, titanium dioxide, Wollastonite, novaculite, potassium titanate and titanate whiskers, glass flakes, glass beads and fibers, and polymeric fibers and combinations thereof.

Although it is only necessary to use a reinforcing amount of the reinforcing agent, from 1–60 parts by weight of the total weight of the composition may comprise the reinforcing agent. A preferred range is from 5–40 parts by weight.

The preferred reinforcing agents are of glass, and it is preferred to use fibrous glass filaments, mixtures of glass and talc, glass and mica and glass and aluminum silicate, for example. The preferred filaments for plastics reinforcement are made by mechanical pulling. Preferably, the glass filament diameters range from about 0.00012 to about 0.00075 inch, but this is not critical to the present invention.

The aromatic carbonate polymer may comprise from 1 to 99 parts by weight of the composition and the polyester resin derived from cyclohexanedimethanol resin may comprise from 99 to 1 parts by weight of the composition. Preferably, the aromatic carbonate polymer comprises from 25 to 98 by weight of the composition and the polyester derived from cyclohexanedimethanol comprises from 2 to 75 by weight of the composition.

The instant composition may be prepared by any standard procedure and the particular method employed is not critical. For example, pellets made from the polycarbonate resin can be blended with pellets made from the instant polyester resin in an extruder under standard conditions.

Obviously, other materials can also be employed with the composition of this invention and include such materials as antistatic agents, pigments, mold release agents, thermal stabilizers, impact modifiers, extenders, UV stabilizers, nucleating agents, flame retardants and the like.

Illustrative flame retardants are disclosed in U.S. Pat. Nos. 3,917,559, 3,919,167, 3,926,908, 3,931,100, 3,933,734, 3,948,851, 3,951,910, 3,953,396 and 3,940,366, all of which are incorporated herein by reference.

Preferred flame retardant additives are metal salts of sulfonic acids. These are the alkali metal or alkaline earth metal salts of: monomeric or polymeric aromatic sulfonic acids; monomeric or polymeric aromatic sulfone sulfonic acids; aromatic ketone sulfonic acids; heterocyclic sulfonic acids, halogenated methane sulfonic acids; halogenated non-aromatic carboxylic acids; aromatic sulfide sulfonic acids; monomeric or polymeric aromatic ether sulfonic acids; aliphatic and olefinic sulfonic acids; monomeric or polymeric phenol ester sulfonic acids; unsubstituted or halogenated oxocarbon acids; monomeric and polymeric aromatic carboxylic acids and esters and monomeric and polymeric aromatic amide sulfonic acids.

These flame retardant additives are used in minor amounts, preferably from 0.01 to about 10 weight percent, based on the weight of the combination of the aromatic carbonate polymer and polyester.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein. In the examples, all parts and percentages are on a weight basis unless otherwise specified.

EXAMPLE 1

The following compositions were prepared by melt blending the components in an extruder (all parts are by weight):

|                                                          | A   | B  | C  | D  | E  | F  |
|----------------------------------------------------------|-----|----|----|----|----|----|
| polycarbonate resin*                                     | 100 | 75 | 70 | 60 | 40 | 35 |
| poly(1,4-cyclohexanedimethanol terephthalate-co-isophthalate)** | —   | 25 | —  | 40 | 60 | 35 |
| glass                                                    | —   | —  | 30 | —  | —  | 30 |

*LEXAN 101 (General Electric Co.)
**KODAR A150 (Eastman Kodak Co.)

The compositions of Example I were tested and found to have the following physical properties as set forth in Table I.

TABLE I

|                         | A       | B       | C         | D       | E       | F         |
|-------------------------|---------|---------|-----------|---------|---------|-----------|
| Tensile strength (psi)  | 9,500   | 8,532   | 16,676    | 8,297   | 7,355   | 15,528    |
| Tensile elongation (%)  | 110     | 148     | 5.8       | 158     | 196     | 6.0       |
| Flexural strength (psi) | 13,595  | 13,572  | 25,466    | 12,878  | 12,110  | 23,591    |
| Flexural modulus (psi)  | 376,200 | 341,400 | 1,092,200 | 325,400 | 310,200 | 1,035,800 |

EXAMPLE II

The following compositions were prepared by melt blending the components in an extruder (all parts by weight):

|                                                          | G   | H  | I  | J  | K  | L  | M  |
|----------------------------------------------------------|-----|----|----|----|----|----|----|
| polycarbonate resin*                                     | 100 | 75 | 70 | 60 | 50 | 40 | 35 |
| poly(1,4-cyclohexanedimethanol terephthalate-co-isophthalate)** | —   | 25 | —  | 40 | 50 | 60 | 35 |
| glass                                                    | —   | —  | 30 | —  | —  | —  | 30 |

*LEXAN 101
**KODAR A150

The compositions of Example II were tested and found to have the following physical property as set forth in TABLE II.

TABLE II

|                                    | G   | H   | I | J   | K   | L   | M |
|------------------------------------|-----|-----|---|-----|-----|-----|---|
| Gardner Impact Strength (in.-lbs.) | 560 | 560 | 8 | 560 | 560 | 560 | 8 |

EXAMPLE III

The following compositions were prepared by melt blending the components in an extruder (all parts by weight):

|                                                     | N   | O  | P  | Q  | R  | S  | T  | U   |
|-----------------------------------------------------|-----|----|----|----|----|----|----|-----|
| polycarbonate resin*                                | 100 | 90 | 75 | 60 | 50 | 40 | 10 | —   |
| poly(1,4-cyclohexanedimethanol terephthalate-co-isophthalate)** | —   | 10 | 25 | 40 | 50 | 60 | 90 | 100 |

*LEXAN 101
**KODAR A150

The melt viscosity of the compositions of Example III were measured and the results are set forth in TABLE III.

TABLE III

|                      | N    | O    | P    | Q    | R    | S    | T    | U    |
|----------------------|------|------|------|------|------|------|------|------|
| Melt Viscosity (poise) | 9872 | 8710 | 6452 | 4970 | 4264 | 3551 | 2440 | 2303 |
| Time (sec.)          | 43.3 | 38.2 | 28.3 | 21.8 | 18.7 | 15.6 | 10.7 | 10.1 |

EXAMPLE IV

The following compositions were prepared by melt blending the components in an extruder (parts by weight):

|                                                          | V   | W  |
|----------------------------------------------------------|-----|----|
| polycarbonate resin*                                     | 100 | 95 |
| poly(1,4-cyclohexanedimethanol terephthalate-co-isophthalate)** | —   | 5  |

*LEXAN 101
**KODAR A150

The compositions of Example IV were tested and found to have the following physical properties as set forth in TABLE IV.

TABLE IV

|                                              | V    | W    |
|----------------------------------------------|------|------|
| Melt Viscosity (poise)                       | 3250 | 2485 |
| Notched izod impact strength (ft.-lbs./in.)  | 14.7 | 15.5 |
| Double gated izod impact strength (ft-lbs)   | 40   | 40   |

EXAMPLE V

The following compositions were prepared by melt blending the components in an extruder (parts by weight):

|                                                          | X  | Y    |
|----------------------------------------------------------|----|------|
| polycarbonate resin*                                     | 91 | 87.6 |
| glass                                                    | 0  | 4    |
| poly(1,4-cyclohexanedimethanol terephthalate-co-isophthalate)** | 9  | 8.4  |

*LEXAN 101
**KODAR A150

The compositions of Example V were tested and found to have the following physical properties as set forth in TABLE V.

TABLE V

|                                        | X       | Y       |
|----------------------------------------|---------|---------|
| Notched izod impact strength (ft-lbs/in.) | 1.9     | 3.3     |
| Flexural modulus (psi)                 | 500,000 | 496,000 |
| Flexural strength (psi)                | 15,000  | 15,400  |

EXAMPLE VI

The following compositions were prepared by melt blending the components in an extruder (parts by weight):

|                                                          | A′ | B′ |
|----------------------------------------------------------|----|----|
| polycarbonate resin*                                     | 75 | 75 |
| poly(1,4-cyclohexanedimethanol terephthalate-co-isophthalate)** | 25 | —  |

-continued

| | A' | B' |
|---|---|---|
| poly(ethylene terephthalate)*** | — | 25 |

*LEXAN 101
**KODAR A150
***VITEL VFR 3801

The compositions of Example VI were tested and found to have the following physical properties as set forth in TABLE VI.

TABLE VI

| | A' | B' |
|---|---|---|
| Light Transmission (%) | 87 | 35 |
| Tensile elongation (%) | 148 | 108 |

From the preceding Tables, it can be seen that the composition of the instant invention retains the useful properties of aromatic polycarbonate resins while additionally demonstrating improved melt flow properties without loss of impact strength.

Although the above examples have shown various modifications of the present invention, other variations are possible in the light of the above teachings. It is, therefore, to be understood that changes may be made in the particular embodiments of the invention described which are within the full intended scope of the invention as defined by the appended claims.

What is claimed is:

1. A compatible composition consisting essentially of
   (a) a nonhalogenated aromatic polycarbonate derived from bisphenol-A and
   (b) a polyester component consisting of amorphous polyester solely derived from a cyclohexanedimethanol and a mixture of iso and terephthalic acids.

2. A compatible composition in accordance with claim 1 wherein the polyester component is present in quantities which improve the melt viscosity of component (a) but do not substantially affect the impact resistance of component (a).

3. A compatible composition in accordance with claim 1 wherein the polycarbonate is from about 25 to 98 parts of the resinous components and the polyester is from about 2 to 75 parts of the resinous components.

4. A compatible composition in accordance with claims 1 or 3 wherein a flame retardant effective amount of a metal salt of a sulfonic acid is present in the composition.

5. A compatible composition in accordance with claims 1 or 3 herein about 0.01 to about 10 weight percent of a metal salt of a sulfonic acid which has flame retardant qualities is present in the composition.

* * * * *